US009417900B2

(12) United States Patent
Spradlin et al.

(10) Patent No.: US 9,417,900 B2
(45) Date of Patent: Aug. 16, 2016

(54) METHOD AND SYSTEM FOR AUTOMATIC ASSIGNMENT AND PRESERVATION OF NETWORK CONFIGURATION FOR A VIRTUAL MACHINE

(71) Applicant: VMware, Inc., Palo Alto, CA (US)

(72) Inventors: Michael Spradlin, San Francisco, CA (US); Oswald Chen, Palo Alto, CA (US); Hui Li, Palo Alto, CA (US); Frank S. Taylor, London (GB)

(73) Assignee: VMware, Inc., Palo Alto, CA (US)

( * ) Notice: Subject to any disclaimer, the term of this patent is extended or adjusted under 35 U.S.C. 154(b) by 301 days.

(21) Appl. No.: 13/913,210

(22) Filed: Jun. 7, 2013

(65) Prior Publication Data

US 2014/0366018 A1  Dec. 11, 2014

(51) Int. Cl.
*G06F 9/455* (2006.01)
(52) U.S. Cl.
CPC ................... *G06F 9/45533* (2013.01)
(58) Field of Classification Search
None
See application file for complete search history.

(56) References Cited

U.S. PATENT DOCUMENTS

| | | | |
|---|---|---|---|
| 8,151,263 B1* | 4/2012 | Venkitachalam | G06F 9/485 711/162 |
| 8,713,139 B1* | 4/2014 | Kasper et al. | 709/221 |
| 2008/0205377 A1* | 8/2008 | Chao et al. | 370/351 |
| 2010/0082799 A1* | 4/2010 | DeHaan et al. | 709/224 |
| 2010/0174811 A1* | 7/2010 | Musiri et al. | 709/223 |
| 2010/0199188 A1* | 8/2010 | Abu-Hakima et al. | 715/733 |
| 2012/0294192 A1* | 11/2012 | Masood et al. | 370/255 |
| 2014/0229631 A1* | 8/2014 | Keesara et al. | 709/239 |

* cited by examiner

*Primary Examiner* — Kenneth Tang

(57) ABSTRACT

The disclosure herein describes a system, which provides network configuration to a respective network adapter of a large number of cloned virtual machines. During operation, the system stores one or more network identifiers assignable to a network adapter of a cloned virtual machine in a pool of virtual machines cloned from a parent virtual machine. A respective network identifier corresponds to a respective network configuration. The system then determines whether a network identifier for a network adapter of a cloned virtual machine is available. If so, the system assigns the network identifier to the network adapter in response to the network identifier being available, thereby associating the network adapter with the corresponding network configuration.

21 Claims, 8 Drawing Sheets

METHOD AND SYSTEM FOR AUTOMATIC ASSIGNMENT AND PRESERVATION OF NETWORK CONFIGURATION FOR A VIRTUAL MACHINE

BACKGROUND

The exponential growth of the Internet has made it a ubiquitous delivery medium for a variety of applications. Such applications, in turn, have brought with them an increasing demand for bandwidth. As a result, service providers race to build larger and faster data centers with versatile capabilities. Meanwhile, advances in virtualization technologies have made it possible to implement a large number of virtual machines (VMs) in a data center. These virtual machines can essentially operate as physical hosts and perform a variety of functions such as Web or database servers. Because virtual machines are implemented in software, they can freely migrate to various locations. This capability allows service providers to partition and isolate physical resources (e.g., computing power and network capacity) according to customer needs, and to allocate such resources dynamically.

While virtualization brings unprecedented flexibility to service providers, the conventional network architectures, tends to be rigid and cannot readily accommodate the dynamic nature of virtual machines. For example, in conventional virtualization environments, a large number of virtual machines are often dynamically cloned from a single virtual machine (or "the parent virtual machine"). Typically, a respective cloned virtual machine acquires the characteristics of the network adapter (e.g., a virtual network interface card (V-NIC)) of the parent virtual machine. However, some network configurations, such as the layer-2 address (i.e., the physical address) of the network adapter of the parent virtual machine, are not suitable for direct cloning. Consequently, during the cloning process, a respective network adapter of a respective cloned virtual machine is assigned a new layer-2 address, which is usually unique within the virtualization environment.

However, the physical reach of a logical layer-2 broadcast domain (e.g., a virtual local area network (VLAN)) is limited by the transmission medium. Especially for a virtual machine to communicate outside of its broadcast domain (e.g., for providing access to the virtual machine from a remote machine), such communication would need to be carried over layer-3 networks. That is, the packets between the source and destination have to be processed and forwarded by layer-3 devices (e.g., Internet Protocol (IP) routers), since the source and destination can belong to different layer-2 broadcast domains. Consequently, a respective network adapter of a respective cloned virtual machine may require an IP address for facilitating such communication. Well-known mechanisms, such as Dynamic Host Configuration Protocol (DHCP), are typically used for providing IP addresses to virtual machines within a layer-2 broadcast domain. If the network adapters of a large number of cloned virtual machines are associated with the same sub-network (subnet) of the parent virtual machine, these adapters compete for the limited number of IP addresses of the subnet. Hence, configuring separate broadcast domains and corresponding IP addresses for the cloned virtual machines presents a unique challenge.

Existing implementations of virtual machine cloning, however, cannot easily accommodate logical layer-2 broadcast domains and corresponding subnets for a large number of virtual machines cloned from the same parent virtual machine. This is because by default the network adapter of the parent virtual machine is assigned a network identifier through a management interface. This network identifier provides network configurations for the adapter. Such configurations include a logical layer-2 broadcast domain for the adapter and a corresponding subnet. With existing technologies, a respective cloned virtual machine receives the network identifier of the parent virtual machine and, in turn, the logical layer-2 broadcast domain associated with the network identifier and the corresponding subnet configuration.

SUMMARY

The disclosure herein describes a system, which provides network configuration to a respective network adapter of a large number of cloned virtual machines. During operation, the system stores one or more network identifiers assignable to a network adapter of a cloned virtual machine in a pool of virtual machines cloned from a parent virtual machine. A respective network identifier corresponds to a respective network configuration. The system then determines whether a network identifier for a network adapter of a cloned virtual machine is available. If so, the system assigns the network identifier to the network adapter in response to the network identifier being available, thereby associating the network adapter with the corresponding network configuration.

The system can determine the availability of the network identifier based on a number indicating the number of times the network identifier can be assigned to a network adapter. The network configuration corresponding to the network identifier includes an identifier of a virtual local area network (VLAN). This identifier of the VLAN corresponds to a sub-network (subnet). The subnet can be associated with a limited number of Internet Protocol (IP) addresses. The system maintains the number of times the network identifier can be assigned. Based on the assigned network identifier, the system assigns an IP address to the network adapter from the limited number of IP addresses associated with the subnet.

Additionally, the system can store an indicator, which specifies whether a network identifier is enabled for the network adapter. The indicator allows disabling the network identifier for the pool of virtual machines. Furthermore, the assigned network identifier to the network adapter remains persistent during one or more of: i) migrating the cloned virtual machine to a different physical host machine from the current physical host machine; ii) restoring the cloned virtual machine to its original state; iii) restoring the cloned virtual machine to its original size; and iv) updating the cloned virtual machine based on a new snapshot of the parent virtual machine of the cloned virtual machine.

BRIEF DESCRIPTION OF FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Embodiments of the system disclosed herein solve the problem of dynamically providing network configuration to a respective network adapter of a large number of cloned virtual machines by specifying a set of suitable network configurations for a respective network adapter of a respective cloned virtual machine. With existing technologies, a network adapter of a virtual machine is manually configured with a network identifier via a management interface. Such a network identifier can correspond to a virtual local area network (VLAN). This VLAN can further correspond to an Internet Protocol (IP) sub-network (subnet). However, if a large number of virtual machines are cloned from a single virtual machine (or "the parent virtual machine"), a respective cloned virtual machine receives the parent virtual machine's network identifier. In this way, a respective network adapter of a respective cloned virtual machine can be configured with identical VLAN and subnet settings. Consequently, a large number of network adapters with identical subnet settings compete for a limited number of IP addresses associated with the subnet.

To solve this problem, a set of suitable (or assignable) network identifiers for a respective network adapter of a respective cloned virtual machine is specified in a network information data structure. A respective network identifier is associated with a maximum number of network adapters to which the identifier can be assigned. In some embodiments, the maximum number corresponds to the maximum number of IP addresses available for a subnet. A network identifier becomes unavailable for subsequent assignment when this maximum number is reached for the network identifier. When a new virtual machine is cloned, instead of assigning the network identifier of the parent virtual machine, a respective network adapter of the cloned virtual machine is assigned an available network identifier from the set of suitable network identifiers, thereby avoiding competition for a limited number of IP addresses.

Figure 1:
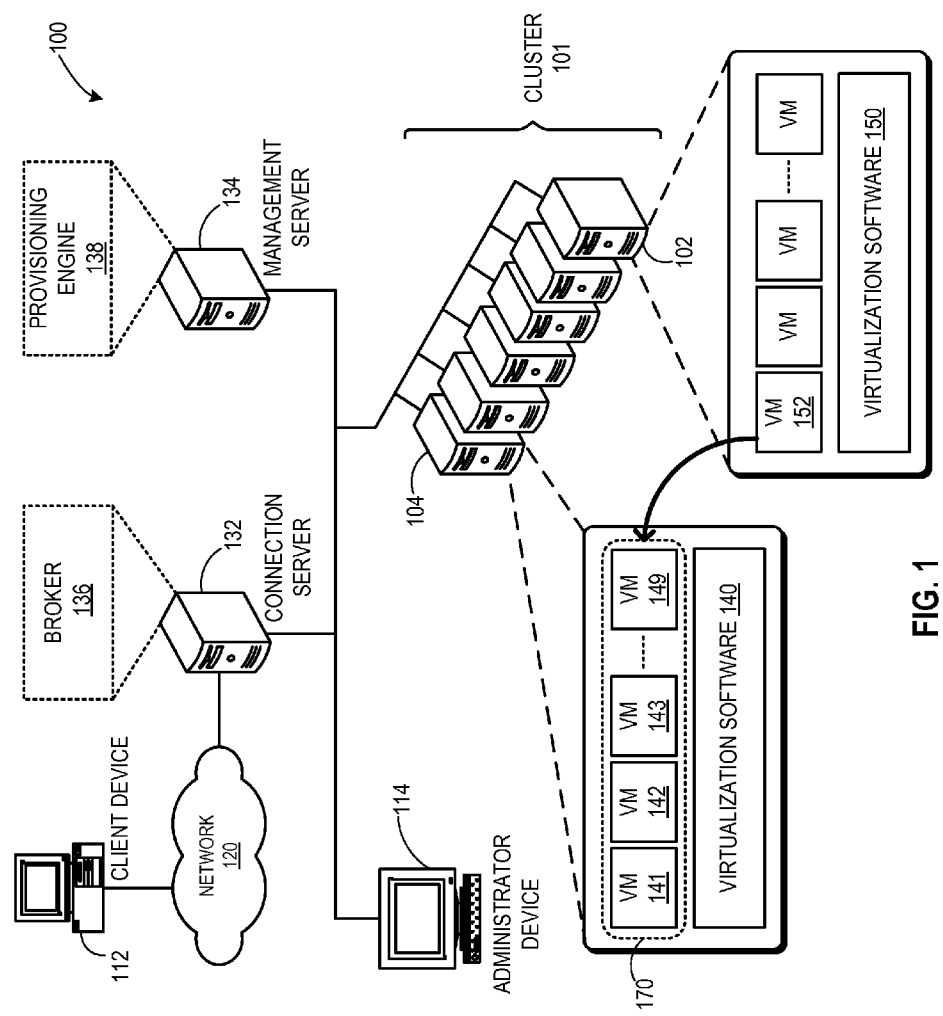
FIG. 1 illustrates an exemplary virtualization environment that facilitates dynamic virtual machine cloning.

FIG. 1 illustrates an exemplary virtualization environment that facilitates dynamic virtual machine cloning. In this example, a virtualization environment 100 provides secured access to centralized virtual machines to authorized users. An example of virtualization environment 100 includes, but is not limited to, a virtual desktop infrastructure (VDI), such as that provided by VMware Horizon View® (registered trademark of VMware, Inc. of Palo Alto, Calif.). Virtualization environment 100 includes a connection server 132, a management server 134, and a cluster 101, which is formed by a plurality of physical host machines (e.g., servers). A respective host machine in cluster 101 can run virtualization software. For example, host machines 102 and 104 of cluster 101 run virtualization software 150 and 140, respectively. Respective virtualization software can run one or more virtual machines. For example, virtualization software 150 runs virtual machine 152 on physical host machine 102. If virtual machine 152 is not a cloned virtual machine, the network adapter of virtual machine 152 is typically configured manually with a network identifier. This network identifier corresponds to a VLAN.

Connection server 132 provides user(s) of client device 112 a secure access to cluster 101 via network 120. Examples of client device 112 include, but are not limited to, a Microsoft Windows® based client, a Linux based client, and a thin client. Connection server 132 includes a broker module 136, which provides management server 134 capabilities to manage cluster 101. Management server 134 includes a composer module 138, which creates and deploys cloned virtual machines in cluster 101. In some embodiments, virtualization environment 100 includes an administrator device 114, which enables an administrator to configure virtualization environment 100, manage cluster 101, and configure entitlement settings of client device 112 and/or user of client device 112. The administrator can use a management interface, a configuration file, or any other techniques to interact via administrator device 114. Note that the administrator uses administrator device 114 to provide input (e.g., a network configuration) to broker module 136 and composer module 138.

During operation, composer module 138 creates a pool 170 of cloned virtual machines from parent virtual machine 152. Pool 170 includes a large number of cloned virtual machines, from 141 to 149. Note that a parent virtual machine and an associated cloned virtual machine can reside on different physical host machines in a cluster. In this example, parent virtual machine 152 runs on virtualization software 150 in host machine 102 while cloned virtual machines 141-149 run on virtualization software 140 in host machine 104. In some embodiments, composer module 138 uses a snapshot of virtual machine 152 (i.e., the state of virtual machine 152 at a particular point in time) to create a respective cloned virtual machine, such as virtual machine 141, in pool 170. Composer module 138 can create pool 170 from a full copy of a virtual machine 152 as well. Consequently, virtual machine 141 receives the configurations of virtual machine 152. In some embodiments, broker module 136 stores and maintains, in a network information data structure, a set of suitable network identifiers for pool 170. A respective network identifier corresponds to a VLAN. This VLAN can further correspond to a subnet. Broker module 136 further enforces a maximum number of network adapters to which the network identifier can be assigned. In some embodiments, this number corresponds to the number of IP addresses associated with the subnet.

During the cloning process, broker module 136 exports this network information data structure to composer module 138. Broker module 136 checks the availability of a respective network identifier associated with pool 170 and assigns an available network identifier to the network adapter of virtual machine 141. In some embodiments, a separate provisioning engine is responsible for allocation of network identifiers. If the maximum number of network adapters assigned to this network identifier has been reached, broker module 136 deems the network identifier unavailable for subsequent assignment. In some embodiments, a number associated with the network identifier indicates the number of subsequent assignments available for the network identifier. Broker module 136 also assigns an available network identifier to the network adapters of virtual machines 142 to 149. In this way, broker module 136 assigns a respective network identifier to a small subset of cloned virtual machines. Consequently, the VLAN associated with the network identifier is assigned to that small subset of cloned virtual machines. Only these cloned virtual machines receive IP addresses associated with the corresponding subnet, thereby allowing these cloned virtual machines to avoid competing for IP addresses with all other virtual machines.

In some embodiments, pools of cloned virtual machines other than pool 170 can share one network identifier and, consequently, can be assigned with IP addresses from the same subnet. Under such circumstances, the network administrator should ensure that the IP addresses belonging to the subnet are not overcommitted. When broker module 136 has assigned the network identifiers, composer module 138 ensures that the assigned network identifiers do not change during management operations on the virtual machines. Examples of management operation include, but are not limited to refresh (i.e., restore a virtual machine 141 to its original state and size for reducing storage costs), recompose (update virtual machine 141 using a new snapshot of its parent virtual machine 152), and rebalance (migrate virtual machine 141 to evenly redistribute cloned virtual machines among physical machines in cluster 101).

Figure 2A:
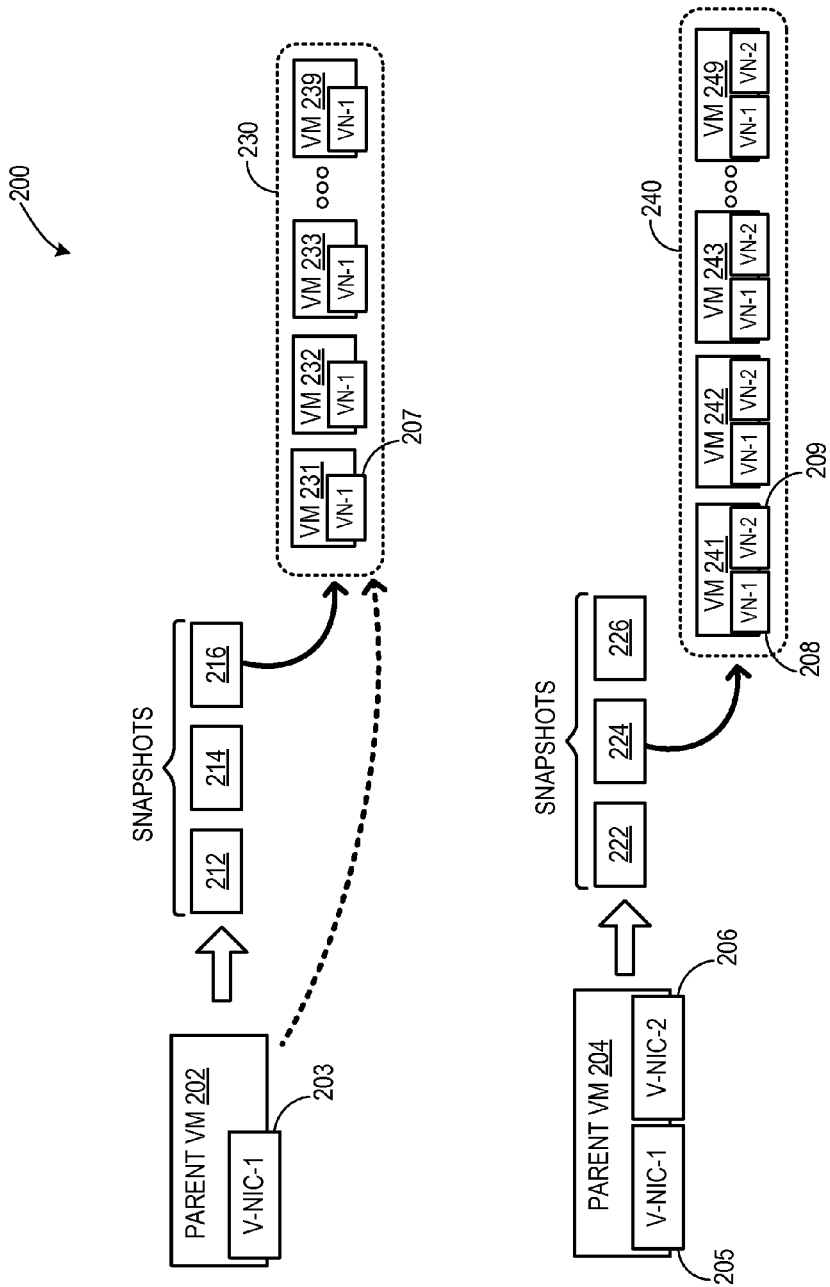
FIG. 2A illustrates exemplary dynamic cloning of virtual machines.

FIG. 2A illustrates exemplary dynamic cloning of virtual machines. In this example, a virtualization environment 200 includes parent virtual machines 202 and 204. Parent virtual machine 202 has a network adapter 203, which is a virtual network interface card (i.e., V-NIC-1); and parent virtual machine 204 has two network adapters 205 and 206, which are also virtual network interface cards (i.e., V-NIC-1 and V-NIC-2, respectively). Virtual machine 202 has a plurality of snapshots 212, 214, and 216, which represent the states of virtual machine 202 at different points of time. Consequently, a respective one of snapshots 212, 214, and 216 includes the configuration of V-NIC-1 of virtual machine 202. Similarly, virtual machine 204 has a plurality of snapshots 222, 224, and 226, wherein a respective one of snapshots 222, 224, and 226 includes the configuration of both V-NIC-1 and V-NIC-2 of virtual machine 204.

During a provisioning operation, the composer module of virtualization environment 200 creates a pool 230 of cloned virtual machines from snapshot 216 of virtual machine 202. In some embodiments, an administrator selects the snapshot for the cloning process. Pool 230 includes a large number, e.g., from tens to thousands, of cloned virtual machines, shown in FIG. 2A numbered from 231 to 239. Because the composer module uses snapshot 216, a respective cloned virtual machine in pool 230 is created with a copy of V-NIC-1 of virtual machine 202. For example, virtual machine 231 is created with a network adapter 207 corresponding to V-NIC-1 of virtual machine 202. Similarly, the composer module of virtualization environment 200 creates a pool 240 of cloned virtual machines from snapshot 224 of virtual machine 204. Note that a cloned virtual machine may not be created from the most recent snapshot of a parent virtual machine. Pool 240 includes a large number of cloned virtual machines, from 241 to 249. A respective cloned virtual machine in pool 240 is created with a copy of both V-NIC-1 and V-NIC-2 of virtual machine 204. For example, virtual machine 241 is created with network adapters 208 and 209 corresponding to V-NIC-1 and V-NIC-2, respectively, of virtual machine 204.

In some embodiments, pool 230 of cloned virtual machines can be created from a full copy of a virtual machine 202. Virtual machine 202 can be considered as a template for the cloned virtual machine in pool 230. Under such a scenario, the composer module of virtualization environment 200 creates pool 230 of cloned virtual machines by using the full copy virtual machine 202 as a template (denoted with a dotted arrow). In other words, pool 230 can be created for both full (e.g., from templates) and linked (e.g., from snapshots) clone virtual machines.

Figure 2B:
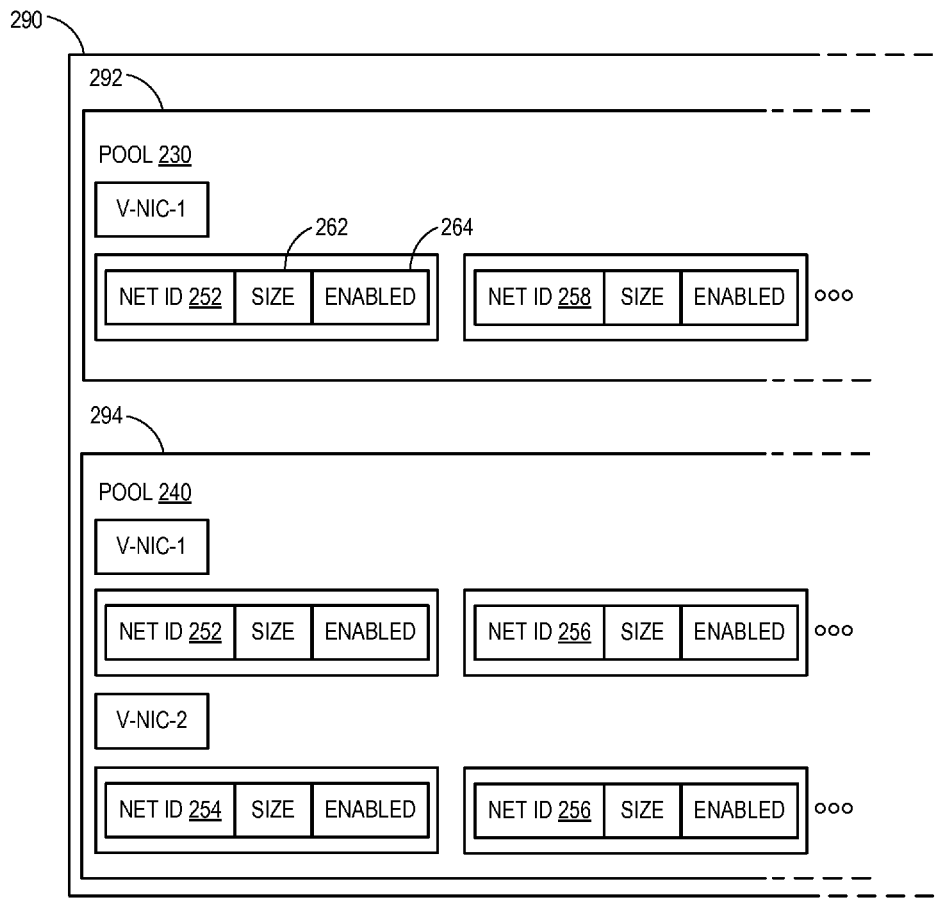
FIG. 2B illustrates an exemplary network information data structure comprising suitable network identifiers for a pool of cloned virtual machines.

Because the composer module uses a snapshot of parent virtual machine 202 to create pool 230, a respective virtual machine in pool 230 receives the configuration of parent virtual machine 202. However, to avoid assigning the same network identifier of network adapter 203, the broker module of virtualization environment 200 stores and maintains, in a network information data structure, a set of suitable network identifiers for a respective network adapter of a respective virtual machine in pools 230 and 240. FIG. 2B illustrates an exemplary network information data structure comprising suitable network identifiers for a pool of cloned virtual machines. Network information data structure 290 thus enables assignment of a suitable network identifier only to a small subnet of cloned virtual machines in pools 230 and 240. Entries 292 and 294 in network information data structure 290 comprise suitable network identifiers for the network adapters of the virtual machines in pool 230 and 240, respectively. Network information data structure 290 can include other entries for other pools as well.

Because a respective virtual machine in pool 230 has a single network adapter, which corresponds to V-NIC-1 of virtual machine 202, entry 292 includes suitable network identifiers for V-NIC-1 of the cloned virtual machines in pool 230. On the other hand, because a respective virtual machine in pool 240 has two network adapters, which correspond to V-NIC-1 and V-NIC-2 of virtual machine 204, entry 294 includes suitable network identifiers for both V-NIC-1 and V-NIC-2 of the cloned virtual machines in pool 240. The same network identifier can be suitable for a plurality of pools and multiple network adapters within the same pool. Furthermore, even within the same pool, different network adapters can have different sets of suitable network identifiers. For example, entry 292 includes at least network identifiers 252 and 258, which are suitable for V-NIC-1 of the virtual machines in pool 230. Entry 294 includes at least network identifiers 252 and 256, which are suitable for V-NIC-1, and network identifiers 254 and 256, which are suitable for V-NIC-2 of the virtual machines in pool 240.

Entries 292 and 294 can include a size for a respective network identifier. This size indicates the available number of times the network identifier can be assigned. In some embodiments, for a respective network identifier, entries 292 and 294 also include an indicator, which indicates whether the network identifier is enabled for the corresponding pool. For example, size 262 in entry 292 indicates the available number of times network identifier 252 can be assigned. After network identifier 252 has been assigned to a network adapter of a cloned virtual machine (e.g., V-NIC-1 of virtual machine 231), the available number of times network identifier 252 can be assigned is reduced by one. Accordingly, size 262 can be updated (e.g., incremented or decremented) to reflect the change. Furthermore, an indicator 264 in entry 292 indicates whether network identifier 252 is enabled for pool 230. Indicator 264 allows an administrator to, if needed, disable network identifier 252 for pool 230 without removing network identifier 252 from entry 292.

Figure 2C:
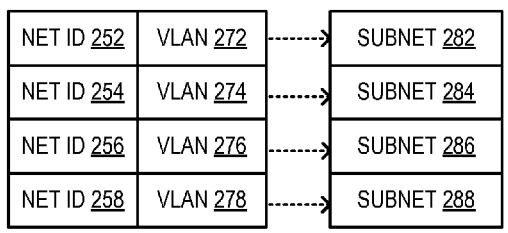
FIG. 2C illustrates an exemplary mapping between network identifiers and corresponding network configurations.

In some embodiments, a respective network identifier maps to a VLAN. FIG. 2C illustrates an exemplary mapping between network identifiers and corresponding network configurations. In this example, network identifiers 252, 254, 256, and 258 are mapped to VLANs 272, 274, 276, and 278, respectively. In the mapping, a respective VLAN can be represented by the VLAN identifier (e.g., VLAN tag) of the VLAN. In some embodiments, a respective VLAN corresponds to a respective subnet. In this example, VLANs 272, 274, 276, and 278 correspond to subnets 282, 284, 286, and 288, respectively. A respective subnet is associated with an IP address range, which can be expressed using classful, classless, or both types of networks. A respective VLAN can include a Dynamic Host Configuration Protocol (DHCP) server, which can be configured with this range of IP addresses. A virtual machine belonging to that VLAN can receive from the DHCP server an IP address only from a limited number of IP addresses specified by the IP address range. In some embodiments, this limited number of IP addresses can correspond to the available size of the corresponding network identifier. For example, if the IP address range of subnet 282 has 254 IP addresses, a network administrator can configure size 262 to specify the value 254.

During the cloning process, the network identifier 252 is assigned to V-NIC-1 of virtual machine 231. As a result, V-NIC-1 of virtual machine 231 is configured with VLAN 272 and receives one of the 254 IP addresses associated with subnet 282. If at least one of the 254 IP addresses associated with subnet 282 is available, the network identifier 252 can be assigned to another network adapter, such as V-NIC-1 of virtual machine 232. Suppose that all 254 IP addresses associated with subnet 282 have been assigned before assigning a network identifier to V-NIC-1 of virtual machine 233. Consequently, network identifier 252 is not assigned to any other network adapters. Instead, network identifier 258 is assigned to V-NIC-1 of virtual machine 233. As a result, V-NIC-1 of virtual machine 233 is configured with VLAN 278 and receives one of the IP addresses associated with subnet 288.

Figure 3A:
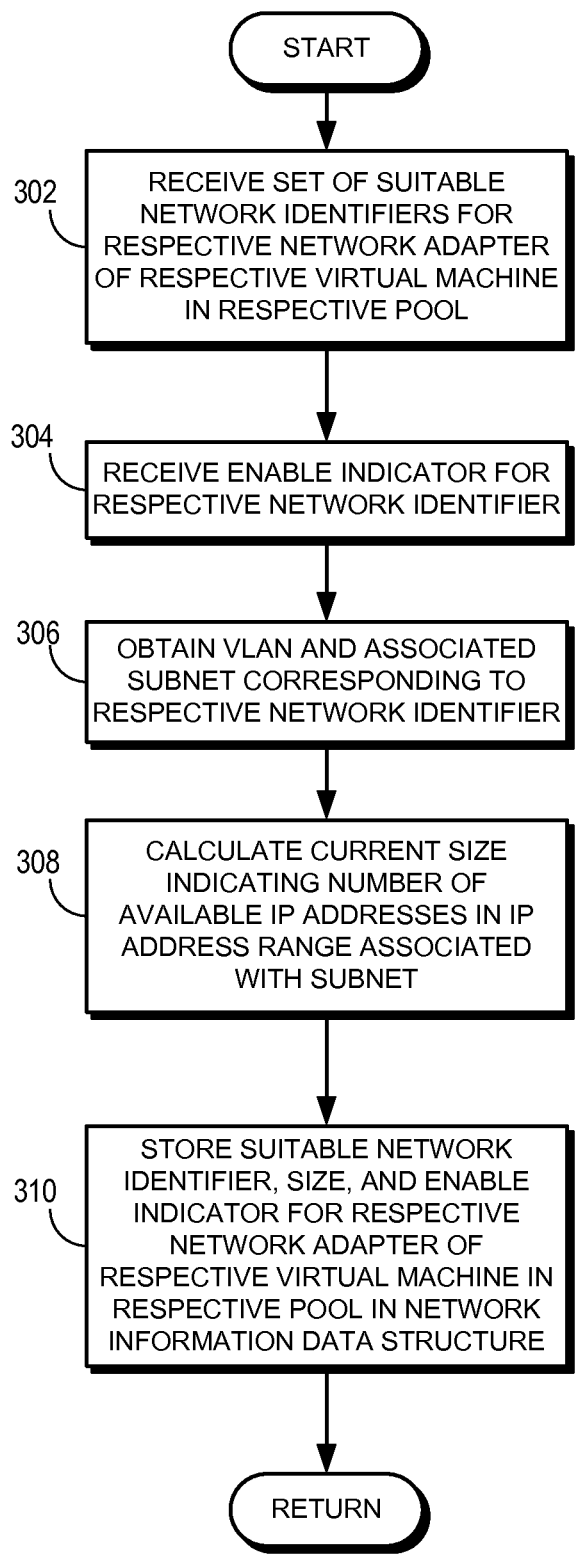
FIG. 3A presents a flow chart illustrating an exemplary process of a broker module storing information in a network information data structure.

FIG. 3A presents a flow chart illustrating an exemplary process of a broker module storing information in a network information data structure. During operation, the broker module receives a set of suitable network identifiers for a respective network adapter of a respective virtual machine in a respective pool (operation 302). In some embodiments, the broker module receives this set of network identifiers from an administrator. The broker module can also receive an enable indicator for a respective network identifier (operation 304). The broker module then obtains the VLAN and associated subnet corresponding to a respective network identifier (operation 306). In some embodiments, the broker module obtains the VLAN and subnet information from a mapping, as described in conjunction with FIG. 2C. The broker module calculates the current size, which indicates the number of available IP addresses in an IP address range associated with the subnet (operation 308). In some embodiments, instead of calculating, the broker module receives the size from an administrator. The broker module then stores a respective network identifier, the size for the identifier, and the corresponding enable indicator in a network information data structure for a respective network adapter of a respective virtual machine in a respective pool (operation 310), as described in conjunction with FIG. 2B.

Figure 3B:
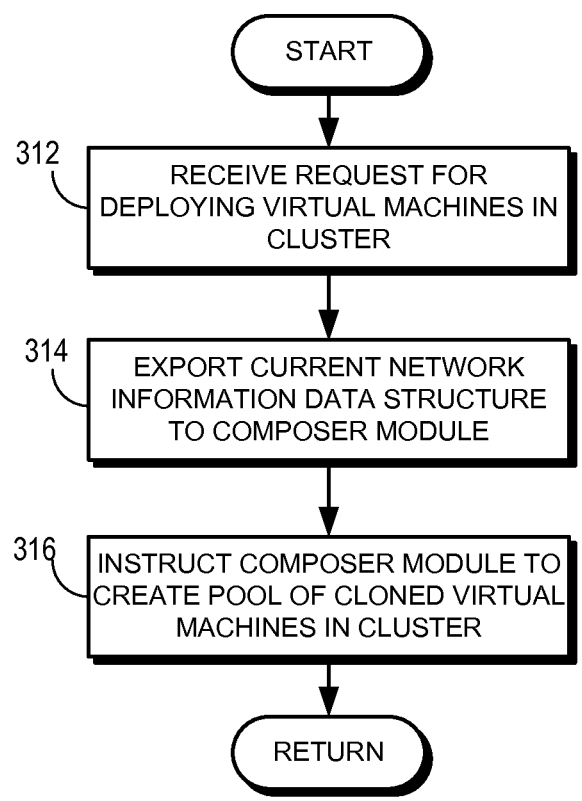
FIG. 3B presents a flow chart illustrating an exemplary process of a broker module providing a network information data structure during the cloning process.

FIG. 3B presents a flow chart illustrating an exemplary process of a broker module providing a network information data structure during the cloning process. During operation, the broker module receives a request for deploying virtual machines in a cluster (operation 312). In some embodiments, the broker module receives this request from an administrator. The request can specify the number of virtual machines required. The broker module then exports the current network information data structure to a composer module of the virtualization environment to which the broker module belongs (operation 314), and instructs the composer module to create a pool of cloned virtual machines based on the request (operation 316). The composer module ensures that the assigned network identifiers to cloned virtual machines do not change during management operations on the virtual machines.

Figure 4:
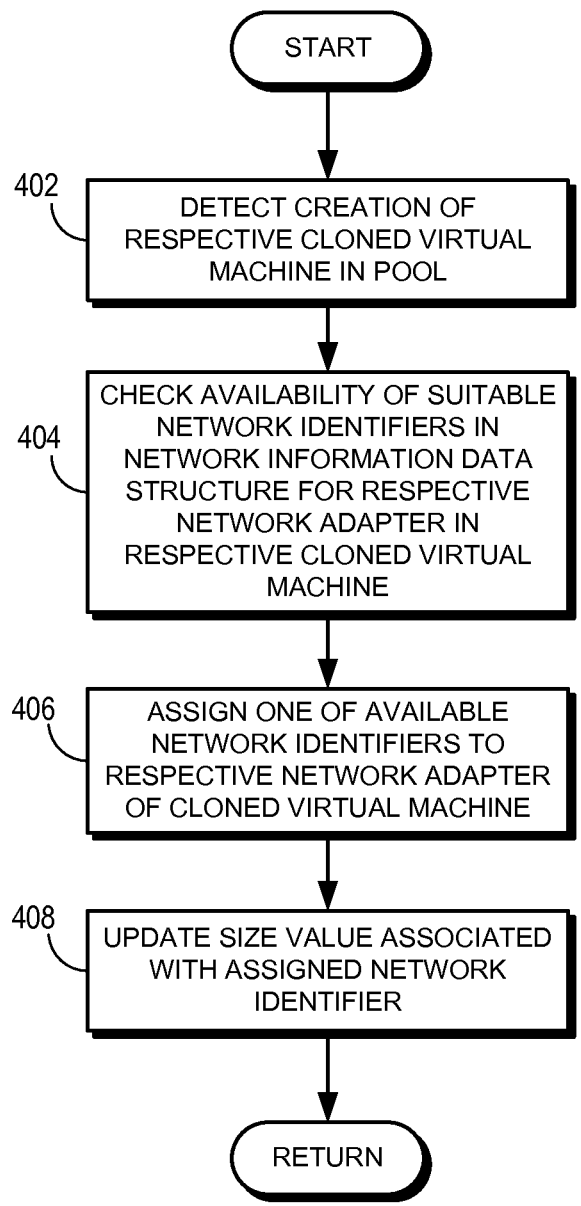
FIG. 4 presents a flow chart illustrating an exemplary process of a broker module configuring a respective virtual network adapter during the cloning process.

FIG. 4 presents a flow chart illustrating an exemplary process of a broker module configuring a respective virtual network adapter during the cloning process. During operation, the broker module detects a respective cloned virtual machine created by the composer module of the virtualization environment to which the broker module belongs (operation 402). The broker module checks availability of suitable network identifiers in the network information data structure for a respective network adapter in a respective cloned virtual machine (operation 404), and assigns one of the available network identifiers to the respective network adapter of the cloned virtual machine (operation 406). Note that the broker module continues to track the availability of the network identifier. If the association between the cloned virtual machine with the network identifier has been removed, the broker module increases the availability of the network identifier. On the other hand, if another virtual machine, which can belong to a different pool, has been associated with the network identifier, the broker module decreases the availability of the network identifier.

Based on this assignment, the network adapter of the cloned virtual machine is configured with a VLAN associated with the assigned network identifier, and allocated an IP address from a DHCP server. In some embodiments, the DHCP server can be configured with a range of IP addresses associated with a subnet corresponding to the VLAN and the network adapter receives from the DHCP server an IP address from the IP address range. The broker module updates size value associated with the network identifier in the network information data structure (operation 408). In this way, the broker module assigns the network identifiers and maintains the number of times a network identifier has been assigned. On the other hand, when the broker module has assigned the network identifier, the composer module ensures that the assigned network identifiers do not change during management operations (described in further details in conjunction with FIG. 5) on the virtual machines.

Figure 5:
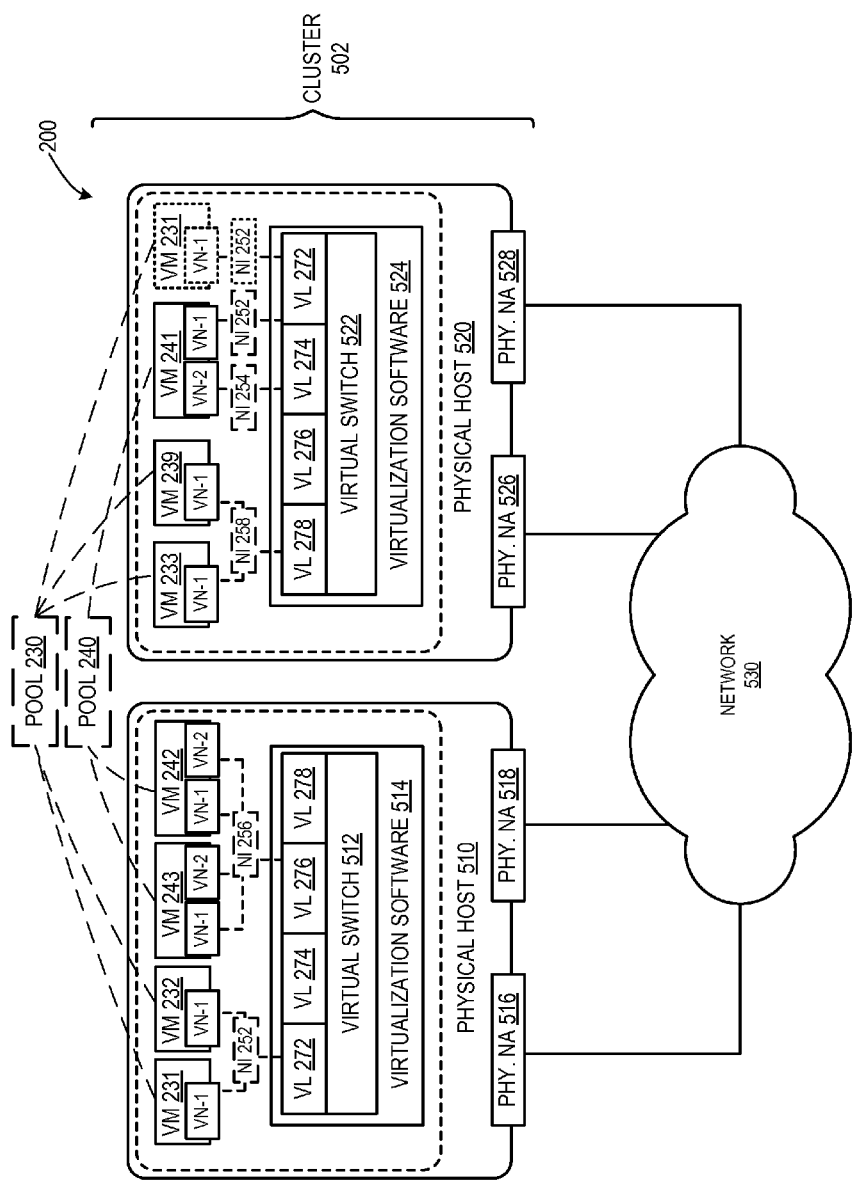
FIG. 5 illustrates exemplary pools of cloned virtual machines.

FIG. 5 illustrates exemplary pools of cloned virtual machines. In this example, virtualization environment 200 includes a cluster 502 comprising physical host machines 510 and 520. Host machine 510 includes two physical network adapters 516 and 518, and host machine 520 includes two physical network adapters 526 and 528. Host machines 510 and 520 are coupled to each other in cluster 502 via network 530. Host machines 510 and 520 run virtualization software 514 and 524, respectively. The virtualization software facilitates communication for the virtual machines via a virtual switch. For example, virtualization software 514 and 524 includes virtual switches 512 and 522, respectively. A respective virtual switch in cluster 502 is configured with all VLANs available to cluster 502. For example, virtual switches 512 and 522 are configured with VLANs 272, 274, 276, and 278, as described in conjunction with FIG. 2C.

During operation, the broker module of virtualization environment 200 allocates virtual machines 231 and 232 of pool 230, and virtual machines 242 and 243 of pool 240 to run on virtualization software 514 in physical host machine 510. The broker module also allocates virtual machines 233 and 239 of pool 230, and virtual machine 241 of pool 240 to run on virtualization software 524 in physical host machine 520. In this way, virtual machines of a pool can run on different physical machines of cluster 502. Furthermore, the broker module, based on network information data structure 290 in FIG. 2B, assigns network identifier 252 to V-NIC-1 of virtual machines 231 and 232, and network identifier 258 to V-NIC-1 of virtual machines 233 and 239 of pool 230. The broker module also assigns network identifier 256 to both V-NIC-1 and V-NIC-2 of virtual machines 242 and 243. However, the broker module assigns network identifier 252 to V-NIC-1 of virtual machine 241 and network identifier 254 to V-NIC-2 of virtual machine 241. In this way, the same network identifier can be assigned to network adapters of different pools (e.g., network identifier 252). Moreover, two network adapters of the same virtual machine (e.g., virtual machine 241) can have different network identifiers (e.g., network identifiers 252 and 254).

As a result of the network identifier assignment, based on the mapping as described in conjunction with FIG. 2C, V-NIC-1 of virtual machine 231 and V-NIC-1 of virtual machine 232 are configured with VLAN 272; and V-NIC-1 of virtual machine 233 and V-NIC-1 of virtual machine 239 are configured with VLAN 278. Similarly, both V-NIC-1 and V-NIC-2 of virtual machines 242 and 243 are configured with VLAN 276. However, V-NIC-1 and V-NIC-2 of virtual machine 241 are configured with VLANs 272 and 274, respectively. In this way, the same VLAN can be assigned to network adapters of different pools (e.g., VLAN 272). Moreover, two network adapters of the same virtual machine (e.g., virtual machine 241) can be configured with different VLANs (e.g., VLANs 272 and 274).

In some embodiments, a network identifier assigned to a network adapter of a virtual machine remains persistent within a cluster. For example, network identifier 252 remains persistent for V-NIC-1 of virtual machine 231. If virtual machine 231 migrates from host machine 510 to host machine 520 (migrated virtual machine 231 is denoted with dotted lines), V-NIC-1 of virtual machine 231 retains network identifier 252. Because both virtual switches 512 and 522 are configured with VLANs 272, 274, 276, and 278, V-NIC-1 of virtual machine 231 retains its configuration of VLAN 272 as well. Furthermore, the composer module keeps network identifier 252 persistent for V-NIC-1 while performing a number of refit operations (i.e., management operations) on virtual machine 231, thereby avoiding reverting to the network identifier of its parent virtual machine 202. Examples of such operations include, but are not limited to, refresh (i.e., restore virtual machine 231 to its original state and size for reducing storage costs), recompose (update virtual machine 231 using a new snapshot of its parent virtual machine 202), and rebalance (migrate virtual machine 231 to evenly redistribute cloned virtual machines among physical machines in cluster 502).

Figure 6:
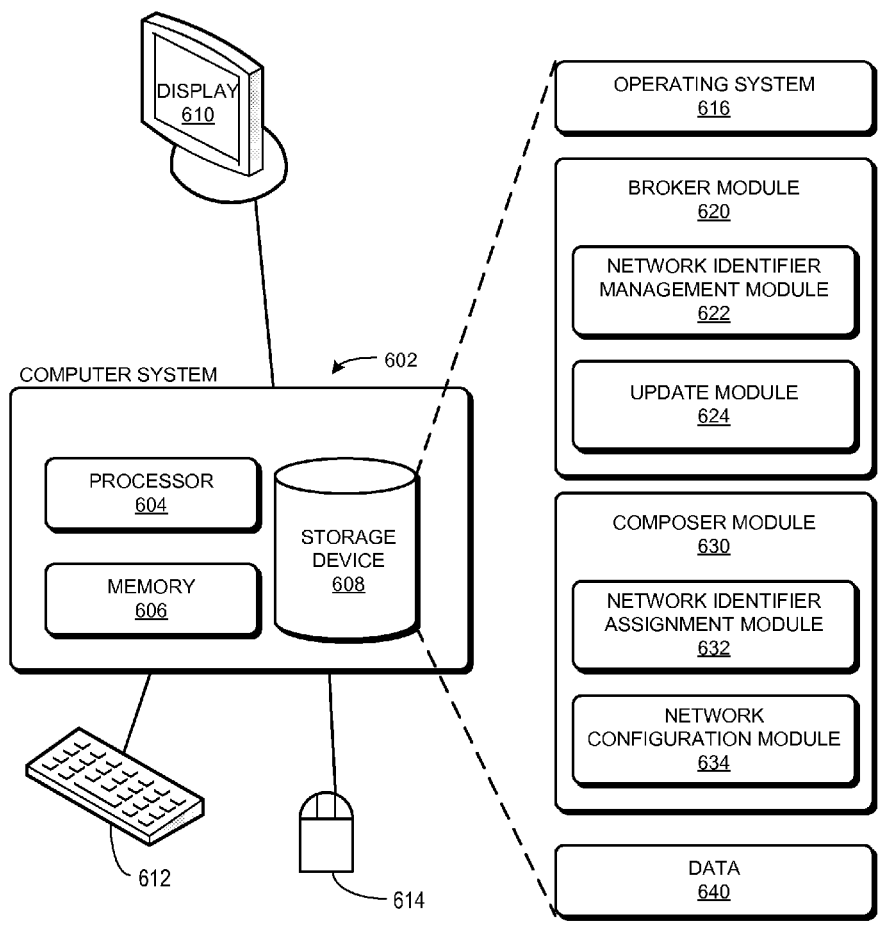
FIG. 6 illustrates an exemplary computer system that facilitates dynamic network configuration of a cloned virtual machine.

It should be noted that the broker and composer modules described herein can be implemented as a stand-alone appliance, as part of a switch or router, or as part of a host. Furthermore, the broker and composer modules can be implemented in hardware or software, or a combination of both. FIG. 6 illustrates an exemplary computer system that facilitates dynamic network configuration of a cloned virtual machine. In this example, a computer system 602 includes a processor 604, memory 606, and a storage device 608. Computer system 602 is also coupled to a display 610, a keyboard 612, and a pointing device 614. Storage device 608 stores data 640 and instructions which when loaded into memory 606 and executed by processor 604 implement an operating system 616, a broker module 620, and a composer module 630. Broker module 620 includes a network identifier management module 622 and an update module 624. Composer module 630 includes a network identifier assignment module 632 and a network configuration module 634. In some embodiments, memory 606 includes a network information data structure. When executed by the processor, these modules jointly or separately perform the functions described above.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for providing network configuration to a respective network adapter of a number of cloned virtual machines, comprising:
    storing in a data structure one or more network identifiers assignable to a network adapter of a cloned virtual machine in a pool of virtual machines cloned from a parent virtual machine, wherein a network identifier comprises a portion of an Internet Protocol (IP) address that identifies a network;
    determining availability of a network identifier from the data structure for the network adapter of the cloned virtual machine; and
    assigning the network identifier to the network adapter in response to the network identifier being available, thereby associating the network adapter with the corresponding network configuration.

2. The computer-implemented method of claim 1, wherein determining availability of the network identifier comprises determining a number of times the network identifier can be assigned to a network adapter.

3. The computer-implemented method of claim 1, wherein the network configuration includes an identifier of a virtual local area network (VLAN).

4. The computer-implemented method of claim 3, wherein the identifier of the VLAN corresponds to a sub-network (subnet) associated with a number of IP addresses; and
wherein the method further comprises assigning an IP address associated with the subnet to the network adapter.

5. The computer-implemented method of claim 1, further comprising updating an available number of times the network identifier can be assigned to a network adapter.

6. The computer-implemented method of claim 1, further comprising storing in the data structure an indicator which specifies whether a network identifier is enabled for the network adapter.

7. The computer-implemented method of claim 1, wherein the assigned network identifier to the network adapter remains persistent during one or more of the following operations:
migrating the cloned virtual machine to a different physical host machine from a current physical host machine;
restoring the cloned virtual machine to its original state;
restoring the cloned virtual machine to its original size; and
updating the cloned virtual machine based on a new snapshot of the parent virtual machine.

8. A non-transitory storage medium storing instructions which when executed by a processor cause the processor to perform a method for providing network configuration to a respective network adapter of a number of cloned virtual machines, the method comprising:
storing in a data structure one or more network identifiers assignable to a network adapter of a cloned virtual machine in a pool of virtual machines cloned from a parent virtual machine, wherein a network identifier comprises a portion of an Internet Protocol (IP) address that identifies a network;
determining availability of a network identifier from the data structure for the network adapter of the cloned virtual machine; and
assigning the network identifier to the network adapter in response to the network identifier being available, thereby associating the network adapter with the corresponding network configuration.

9. The non-transitory storage medium of claim 8, wherein determining availability of the network identifier comprises determining a number of times the network identifier can be assigned to a network adapter.

10. The non-transitory storage medium of claim 8, wherein the network configuration includes an identifier of a virtual local area network (VLAN).

11. The non-transitory storage medium of claim 10, wherein the identifier of the VLAN corresponds to a sub-network (subnet) associated with a number of IP addresses; and
wherein the method further comprises assigning an IP address associated with the subnet to the network adapter.

12. The non-transitory storage medium of claim 8, wherein the method further comprises updating an available number of times the network identifier can be assigned to a network adapter.

13. The non-transitory storage medium of claim 8, wherein the method further comprises storing in the data structure an indicator which specifies whether a network identifier is enabled for the network adapter.

14. The non-transitory storage medium of claim 8, wherein the assigned network identifier to the network adapter remains persistent during one or more of the following operations:
migrating the cloned virtual machine to a different physical host machine from a current physical host machine;
restoring the cloned virtual machine to its original state;
restoring the cloned virtual machine to its original size; and
updating the cloned virtual machine based on a new snapshot of the parent virtual machine.

15. A computing system for providing network configuration to a respective network adapter of a large number of cloned virtual machines, the computing system comprising:
a processor; and
a storage device coupled to the processor and storing instructions which when executed by the processor cause the processor to perform a method, the method comprising:
storing in a data structure one or more network identifiers assignable to a network adapter of a cloned virtual machine in a pool of virtual machines cloned from a parent virtual machine, wherein a network identifier comprises a portion of an Internet Protocol (IP) address that identifies a network;
determining availability of a network identifier from the data structure for the network adapter of the cloned virtual machine; and
assigning the network identifier to the network adapter in response to the network identifier being available, thereby associating the network adapter with the corresponding network configuration.

16. The computing system of claim 15, wherein determining availability of the network identifier comprises determining a number of times the network identifier can be assigned to a network adapter.

17. The computing system of claim 15, wherein the network configuration includes an identifier of a virtual local area network (VLAN).

18. The computing system of claim 17, wherein the identifier of the VLAN corresponds to a sub-network (subnet) associated with a number of IP addresses; and
wherein the method further comprises assigning an IP address associated with the subnet to the network adapter.

19. The computing system of claim 15, wherein the method further comprises updating an available number of times the network identifier can be assigned to a network adapter.

20. The computing system of claim 15, wherein the method further comprises storing in the data structure an indicator which specifies whether a network identifier is enabled for the network adapter.

21. The computing system of claim 15, wherein the assigned network identifier to the network adapter remains persistent during one or more of the following operations:
migrating the cloned virtual machine to a different physical host machine from a current physical host machine;
restoring the cloned virtual machine to its original state;
restoring the cloned virtual machine to its original size; and
updating the cloned virtual machine based on a new snapshot of the parent virtual machine.

* * * * *